United States Patent
Cai et al.

(10) Patent No.: US 7,010,104 B1
(45) Date of Patent: Mar. 7, 2006

(54) PRE-BILLER CAPABILITY IN ENHANCED CHARGING COLLECTION FUNCTION (CCF) APPLICATIONS

(75) Inventors: Yigang Cai, Naperville, IL (US); Qing Hong He, Beijing (CN); Min Liu, Beijing (CN); John B. Reid, Naperville, IL (US); Ashish Trivedi, Naperville, IL (US); Yile Enoch Wang, Freehold, NJ (US); Jay Z. Zhao, Beijing (CN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/926,864

(22) Filed: Aug. 26, 2004

(51) Int. Cl.
  *H04M 15/00* (2006.01)
  *H04M 11/00* (2006.01)

(52) U.S. Cl. ............ 379/126; 379/112.05; 379/121.05; 455/460

(58) Field of Classification Search ............... 379/126, 379/133, 134, 112.01, 112.05, 114.01, 114.03, 379/121.05; 455/406
See application file for complete search history.

(56) References Cited

U.S. PATENT DOCUMENTS

| | | | |
|---|---|---|---|
| 2003/0229613 A1* | 12/2003 | Zargham et al. | 707/1 |
| 2005/0009500 A1* | 1/2005 | Ear | 455/408 |
| 2005/0149365 A1* | 7/2005 | Johnson | 705/4 |

* cited by examiner

*Primary Examiner*—Barry W Taylor

(57) ABSTRACT

This invention relates to a method and apparatus for charging and billing of Circuit Switch, Packet Switch, and IP Multimedia Subsystems in third generation telecommunication systems. The charges for a call are computed by a rating engine, a software system comprising data tables and a program for calculating charges from the parameters of the call, such as the calling and called numbers, the length of the call, and special charge items such as priority service. For calls whose billing cannot be deferred, referred to as on-line billing calls, the rating engine is accessed immediately. For calls whose billing can be deferred, referred to as off-line billing calls, the rating engine performs its function only when the rating engine is not busy rating on-line billing calls, for example, during periods outside the busy hour. Advantageously, only a single rating engine is required, and the capacity of that single rating engine is determined only by the busy-hour volume of on-line billing calls.

10 Claims, 3 Drawing Sheets

PRE-BILLER CAPABILITY IN ENHANCED CHARGING COLLECTION FUNCTION (CCF) APPLICATIONS

RELATED APPLICATION

This application is related to an application of Xiang Yang Li, Min Liu, John B. Reid, Guy H. Starner, Ashish Trivedi, Peng Wang, Yile Enoch Wang, Jun Zheng Yang, Lei Zhang, and Jay Z. Zhao entitled "New Call Authorization And Billing Message Routing Capability", which application is assigned to the assignee of the present application and is being filed concurrently herewith.

TECHNICAL FIELD

This invention relates to a method and apparatus for charging and billing of Circuit Switch, Packet Switch, and IP Multimedia Subsystems.

BACKGROUND OF THE INVENTION

This document describes a method and apparatus for enhancing the charge collection function, using third generation telecommunication systems as an example.

The introduction of the third Generation Partnership Project (3GPP) and the third Generation Partnership Project 2 (3GPP2) harmonization effort known as IP (Internet Protocol) Multimedia Sub-system (IMS) has introduced new convergence network elements based on IP based signaling protocols and bearer connections. The goal is to create a harmonized wireless and wireline IP based control network for telecommunications. The IMS network nodes include the Proxy-Call Session Control Function (P-CSCF), Interrogating-CSCF (I-CSCF), Serving-CSCF (S-CSCF), Media Gateway Control Function (MGCF), the Breakout Gateway Control Function (BGCF), the Media Resource Function Controller (MRFC), and Application Servers (AS). In order to perform charging functions in the converged IMS network, each of the network elements have a defined interface to a new node called the Charging Collection Function (CCF). CCF, defined in 3GPP and 3GPP2 standards documents, is an off-line charging network node in the IMS network. CCF collects session charging information from IMS nodes, and constructs and formats Call Detail Records (CDRs). It provides intermediate data storage buffering and provides a mechanism to transfer charging information to the operator's billing system (BS).

For IMS, the CCF provides the mechanism to transfer charging information from the IMS nodes to the operator's chosen Billing System(s). The CCF is responsible for the collection of session charging information from the IMS nodes. The CCF may also act as an intermediate data storage device and therefore needs to support storage of CDRs for a specified period of time given a usage profile. Further, the CCF in 3GPP standards must create ASN.1 (Abstract Syntax Notation.1) base Charging Detail Records. These CDRs are transferred to the BS/BMD (Billing Mediation Device) nominally using FTP (File Transfer Protocol), but other protocols and transport methods are possible. The CCF can receive data from the IMS nodes in a near real-time mode. It should have enough storage to enable it to transmit the collected charging data to the BS in file mode. The CCF may support several transmission protocols towards the BS. One of the purposes for the CCF is to reduce the number of different interfaces between the BS and the IMS nodes sending charging data.

In the IMS system, on-line charging is conducted by an Online Charging Server (OCS). IMS nodes query OCS with charging information. OCS rates calls with a built-in rating engine and provides charging cost and generates CDRs. OCS can support both prepaid and postpaid modes.

3GPP and 3GPP2 are generalizing the aforementioned IMS charging architecture to the entire 3G network, which includes Circuit Switch and Packet Switch networks.

However, there are no standards (neither 3GPP nor 3GPP2) which support the charging and rating concept in CCF so that it cannot provide call cost in CDRs. All rating and billing information must be processed in a back office billing system. That limits the capability of IMS/CCF to postpaid and offline billing only.

SUMMARY OF THE INVENTION

Applicants have carefully analyzed the characteristics of prior art billing arrangements. In the most modern of these billing arrangements, designed for use with the third generation telecommunications systems, there are two distinct methods of billing calls, one method for use with deferred (off-line) billing (via CCF) and a second method for use with immediate billing (on-line) (via OCS). Calls with deferred billing build up a call data record (CDR) for each call, the call data record having data from which charging information can be derived (e.g., length of call or start and finish time of a call, calling and called customer identification); the call data records for these calls are then passed on to a billing system. The billing system includes a rating engine (i.e., software and data tables for calculating the charge for a call given the parameters of the call). The billing system then generates the customer's bills. Customer Care Systems can retrieve the CDRs from the billing system if the customers complain; the customer service representatives can modify charge records by crediting back an amount to the customer account if there is charge error.

For calls requiring immediate (on-line) billing, a call data record is built up and passed to an on-line charging system which includes a rating engine. This system can provide an output to whatever system needs the charging information (e.g., a hotel data link to provide charging information to a hotel or a prepaid account manager to adjust a prepaid balance). The on-line charging system then passes the call data record to the billing system which prepares bills (e.g., the bill to the hotel) for calls requiring both on-line and off-line charging.

Applicants have inventively discovered a method and apparatus for streamlining both the on-line and off-line billing process by utilizing a common charging system, which includes charging, rating, and subscriber balance management functions. The charging system is able to process online calls as an Online Charging System (OCS) as defined by 3GPP and 3GPP2, as well as a charging system for offline calls in real-time or non-real-time. If an offline call requires real-time charging, a call data record is built and a single rating engine built within the OCS is consulted immediately to determine charges on that call; for an offline call requiring only non-real-time billing, the call data record is built without immediately including the charge information and the single rating engine built within the OCS is consulted only when that rating engine is not busy calculating charges for an on-line billing call. As a result, advantageously, a common charging system can be used for both online and offline calls, thus achieving charging convergence, which reduces service provider investment, operation, and maintenance cost and enhances end user service experience. Advantageously, the billing information for calls requiring off-line billing can be derived outside the busy hour; advantageously, the billing system does not need to calculate bills but is required only to store a billing database in order to generate monthly invoices, statistical reports, etc. Advantageously, with this arrangement call data records with call cost can be stored in the billing database and be ready to be pulled by any back-office system, e.g., report generation, customer care, and invoice generation systems. Another benefit of this arrangement is that it can support charging for prepaid subscribers in case the subscriber is roaming in a foreign network that has no real time charging protocol support.

BRIEF DESCRIPTION OF THE DRAWING(S)

DETAILED DESCRIPTION

Figure 1:
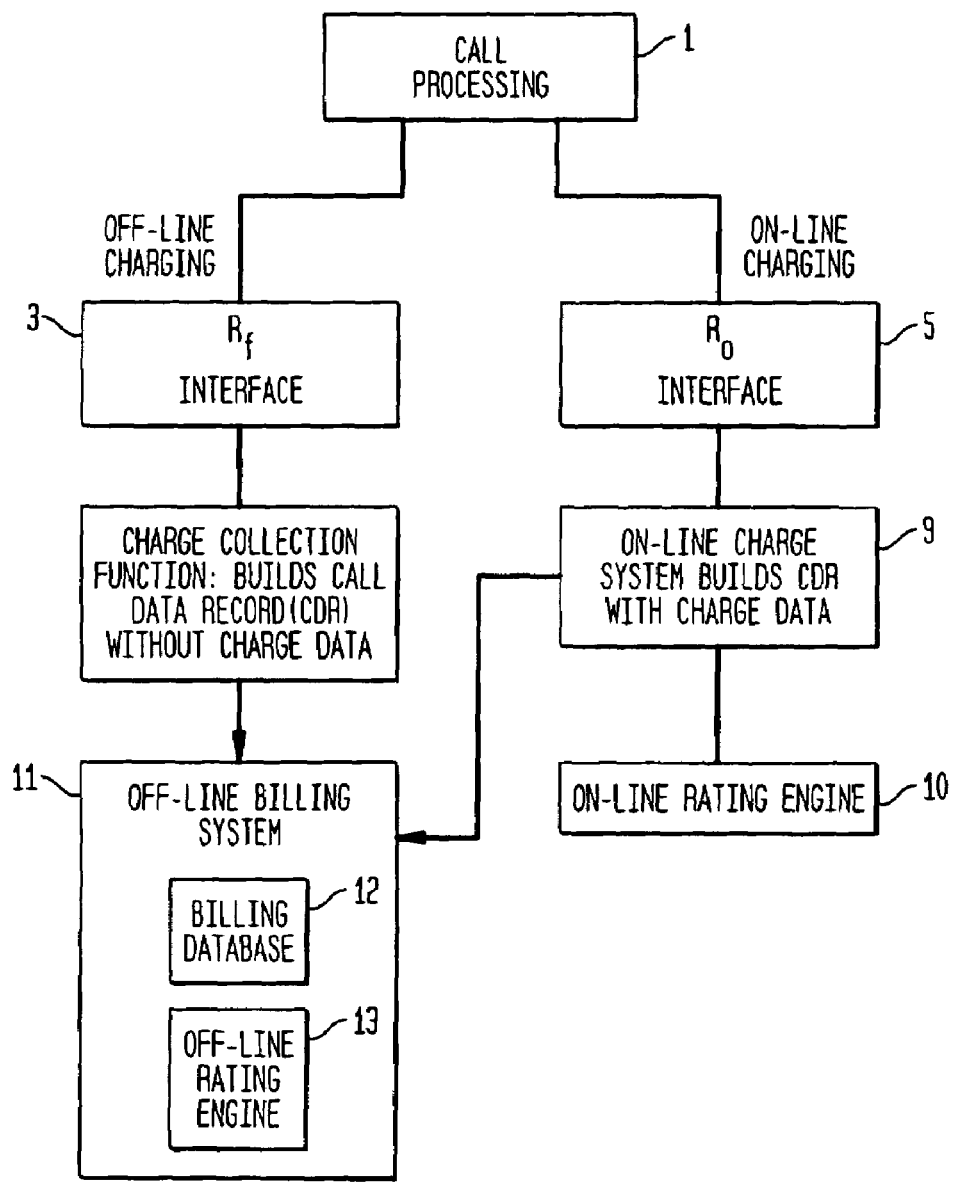
FIG. 1 is a block diagram illustrating the operation of a prior art system.

FIG. 1 is a block diagram illustrating the operation of a prior art system. The system is used in the third generation telecommunications systems and specifically in Internet Protocol (IP) Multimedia Subsystems for the third generation partnership project (3GPP). When a telecommunications call is processed using a call processing system 1 one of the outputs of this call processing system is a pair of outputs for billing purposes. Outputs for billing of calls billed by an off-line billing process are transmitted through an Rf interface 3. The Rf interface is defined, for example, by Section 5.1 of document 3GPP TS32.225, a standards document. The output for calls requiring on-line billing are transmitted through $R_o$ interface 5 which is defined in Section 6.1 of the same document. The output of Rf interface 3 is transmitted to the charge collection function 7. The function of charge collection function 7 is to build a call data record which has the parameters for charging but contains no charging data (call cost) since the charging data will eventually be calculated by billing system 11, which includes a billing database 12 for storing billing records. The output of the charge collection function I in block 7 is transmitted to this billing system 11 which includes an off-line rating engine 13 for determining charges based on the call parameters of a call data record.

The back-office systems access and process the billing records in a batch mode. They do not wait for CDRs to come in for processing, but process whatever CDRs are available at a given time.

For calls requiring on-line billing processing, the connection from the call processing system 1 via $R_o$ interface 5 is terminated on on-line charging system (OCS) 9. OCS 9 includes an on-line rating engine 10 for use in calculating charges for calls processed by OCS 9. Accordingly, OCS 9 builds a call data record including the call cost and transmits this call data record to billing system 11 for subsequent printing of bills and other back-office operations, and for access by the back-office systems.

Figure 2:
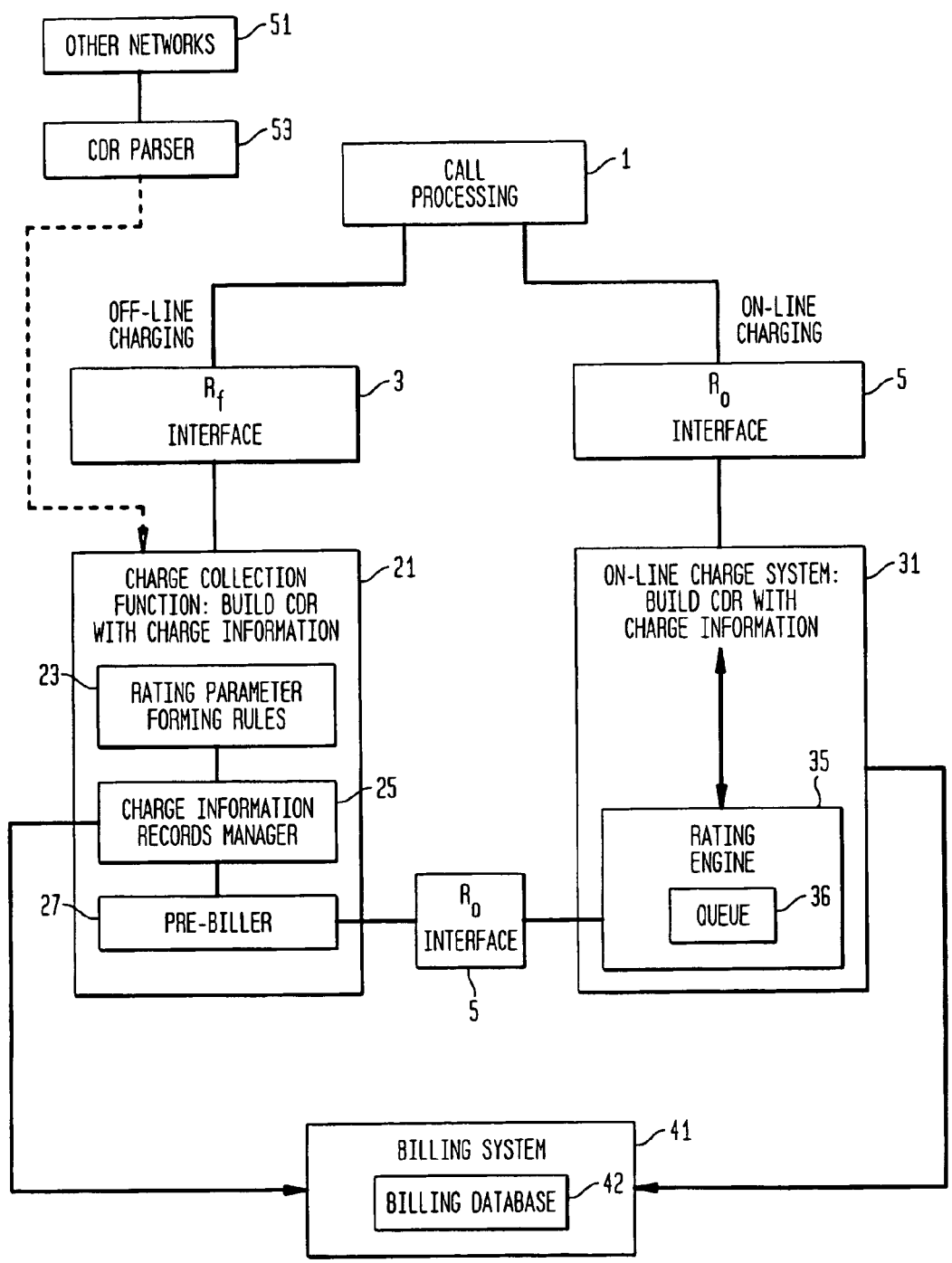
FIG. 2 is a block diagram illustrating the operation of Applicants' invention.

FIG. 2 is a block diagram illustrating the operation of Applicants' invention. The treatment of calls requiring on-line processing is very similar to the treatment of such calls in the prior art system of FIG. 1. Data is sent from call processing via $R_o$ interface 5 to on-line charging system 31. OCS 31 has been expanded from OCS 9 to illustrate that the block for building the call data record 33 is separate from the rating engine 35, in order to allow the rating engine 35 to be accessed by either the block for building a call data record 33 or the charge collection function (CCF) 21 to be described below. The data connection between blocks 33 and 35 requires immediate access because the calls must be billed on line. In contrast, the data connection between CCF 21 and rating engine 35 can accommodate deferred requests.

For calls requiring only off-line charge processing, the data is transmitted from call processing 1 via Rf interface 3 to CCF 21. Block 21 includes rating parameter forming rules software and tables (block 23), which populate call data records with corresponding rating parameters of interest, a charging information records manager 25, and a pre-biller unit 27 for interfacing with rating engine 35. The pre-biller unit 27 interfaces with rating engine 35 via $R_o$ interface 5. Requests from the pre-biller to the rating engine can be deferred if the rating engine is fully occupied with rating on-line calls during the busy hour.

After charging information has been obtained for a particular call by the pre-biller 27, the charging information records manager 25 sends the call data record to a billing system 41, which includes a billing database 42 that can be accessed by the back-office systems. Note that the billing database 42 contains complete charging information for both on-line charged calls, the data being received from OCS 31, and for off-line charged calls, the data being received from CCF 21.

The system of FIG. 2 can also serve off-line billed calls received from other networks 51. Data for these calls passes through a CDR parser 53 to CCF 21.

Figure 3:
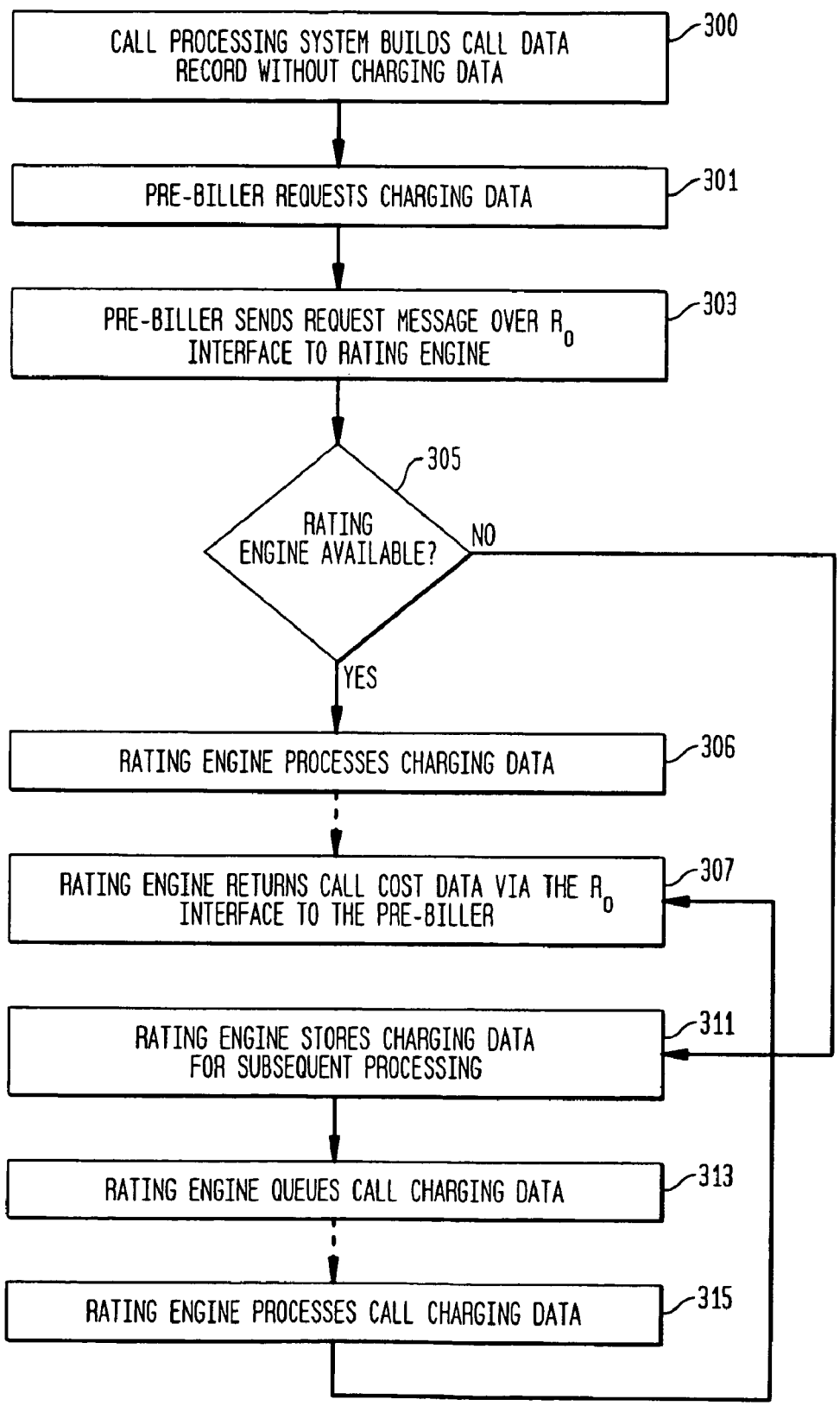
FIG. 3 is a flow diagram illustrating the processing of rating data by the rating engine.

FIG. 3 illustrates the processing of off-line, non-real-time charged calls. The call processing system 1 builds a call data record without charging data (action block 300). The pre-biller requests charging information (action block 301). The pre-biller sends a message over the $R_o$ interface to the rating engine (action block 303). Test 305 determines whether the rating engine is available. If it is available, the rating engine processes the charging data (action block 306) and returns call cost data to the pre-biller via the $R_o$ interface (action block 307).

If the rating engine is not available (negative result of test 305), the rating engine stores the charging data for subsequent processing (action block 311). The rating engine then queues the call charging data (action block 313) for processing when the rating engine becomes available. The rating engine (FIG. 2, block 35) contains a queue 36 for storing deferred processing call charging data. It may also be desirable to have a separate queue for charging data for real-time charged calls, to handle a flurry of requests. The latter queue (not shown) would be served before queue 36; queue 36 would only be served if this latter queue were empty. When the rating engine becomes available and has processed all previous queued calls, the rating engine processes the charging data for this call (action block 315). The rating engine then returns the call cost data to the pre-biller, via the $R_o$ interface (action block 307, previously described).

The above description is of one preferred embodiment of Applicants' invention. Other embodiments, including embodiments for operation with other telecommunication systems, will be apparent to those of ordinary skills in the art without departing from the scope of the invention. The invention is limited only by the attached claims.

We claim:

1. In a telecommunications network, a method of performing the processing of off-line billed telecommunications calls, comprising the steps of:
   responsive to receipt of a telecommunications call, building up a call data record that is missing call cost data;
   accessing a rating engine for calculating call cost data from parameters of said call stored in said call data record; and
   completing said call data record including call cost data obtained from said rating engine;
   characterized in that:
   said rating engine is accessed for obtaining call cost data for off-line charged calls in such a way as to give preference to the rating of on-line charged calls and without reducing the capacity of said rating engine to rate on-line charged calls;
   wherein a common rating engine is used for rating off-line and on-line rated calls;
   wherein the completed call data record including call cost data is formed prior to transmitting said call data record to a billing system.

2. The method of claim 1 wherein the step of accessing said rating engine comprises the step of:
   queuing data for an off-line billed call until said rating engine is not processing on-line billed calls.

3. The method of claim 2 wherein the step of queuing comprises the step of queuing in said rating engine.

4. The method of claim 2 wherein the step of queuing comprises the steps of:
   testing whether said rating engine is available; and
   if said rating engine is available, by-passing the step of queuing and directly accessing the rating engine for calculating call cost for an off-line billed call.

5. The method of claim 2 further comprising the step of:
   separately queuing data for on-line billed calls in a queue for on-line billed calls;
   wherein off-line billed calls are processed by said rating engine only if the queue for on-line billed calls is empty.

6. In a telecommunications network, apparatus for performing the processing of off-line billed telecommunications calls, comprising:
   means, responsive to receipt of a telecommunications call, for building up a call data record that is missing call cost data;
   means for accessing a rating engine for calculating call cost data from parameters of said call stored in said call data record; and
   means for completing said call data record including call cost data obtained from said rating engine;
   characterized in that:
   said means for accessing said rating engine for obtaining call cost data for off-line charged calls gives preference to the rating of on-line charged calls without reducing the capacity of said rating engine to rate on-line charged calls;
   wherein said rating engine is a common rating engine used for rating off-line and on-line rated calls;
   wherein said means for completing said call data record transmits said completed call data record including call charging information to a billing system.

7. The apparatus of claim 6 wherein said means for accessing said rating engine comprises:
   means for queuing data for an off-line billed call until said rating engine is not processing on-line billed calls.

8. The apparatus of claim 7 wherein said means for queuing comprises means for queuing in said rating engine.

9. The apparatus of claim 7 wherein said means for queuing comprises:
   means for testing whether said rating engine is available; and
   if said rating engine is available, by-passing the process of queuing and directly accessing the rating engine for calculating call cost for an off-line billed call.

10. The apparatus of claim 7 further comprises:
    means for separately queuing data for on-line billed calls in a queue for on-line billed calls;
    wherein off-line billed calls are processed by said rating engine only if said queue for on-line billed calls is empty.

* * * * *